United States Patent
Iwazawa et al.

(10) Patent No.: US 7,016,775 B2
(45) Date of Patent: Mar. 21, 2006

(54) CONTROLLER AND CONTROL METHOD FOR AN ELECTRIC POWER STEERING APPARATUS

(75) Inventors: Masahide Iwazawa, Aichi-ken (JP); Kiyotaka Iwata, Handa (JP); Akira Ito, Kariya (JP); Yasushi Yamada, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/314,984

(22) Filed: Dec. 10, 2002

(65) Prior Publication Data
US 2003/0130777 A1 Jul. 10, 2003

(30) Foreign Application Priority Data
Dec. 11, 2001 (JP) .............................. 2001-377061

(51) Int. Cl.
- A01B 69/00 (2006.01)
- B62D 11/00 (2006.01)
- G01M 17/00 (2006.01)
- G05B 21/02 (2006.01)

(52) U.S. Cl. .................. 701/41; 701/29; 701/31; 701/43; 340/636.15; 318/636; 318/638; 318/650

(58) Field of Classification Search ............... 701/29, 701/31, 35, 41, 43; 340/636.15; 318/636, 318/638, 350
See application file for complete search history.

(56) References Cited

U.S. PATENT DOCUMENTS

| | | | | |
|---|---|---|---|---|
| 4,348,629 A | * | 9/1982 | Sievers | 322/99 |
| 4,459,548 A | * | 7/1984 | Lentz et al. | 324/772 |
| 5,233,285 A | * | 8/1993 | Pierret et al. | 322/28 |
| 5,243,324 A | * | 9/1993 | Bober | 340/439 |
| 5,257,190 A | * | 10/1993 | Crane | 701/35 |
| 5,758,741 A | * | 6/1998 | Tomioka | 180/446 |
| 6,275,161 B1 | * | 8/2001 | Wan et al. | 340/636.15 |
| 6,363,303 B1 | * | 3/2002 | Bertness | 701/29 |
| 6,515,872 B1 | * | 2/2003 | Nakayama et al. | 363/17 |
| 6,624,604 B1 | * | 9/2003 | Torikoshi et al. | 318/443 |
| 6,806,727 B1 | * | 10/2004 | Thibedeau et al. | 324/772 |
| 2001/0026226 A1 | * | 10/2001 | Andersson et al. | 340/636 |
| 2002/0021150 A1 | * | 2/2002 | Tuchiya et al. | 327/108 |
| 2002/0145842 A1 | * | 10/2002 | Kumar et al. | 361/93.9 |
| 2003/0137307 A1 | * | 7/2003 | Serratoni et al. | 324/521 |
| 2003/0155928 A1 | * | 8/2003 | Roden et al. | 324/509 |
| 2004/0135581 A1 | * | 7/2004 | Blessing et al. | 324/426 |

FOREIGN PATENT DOCUMENTS

| | | | |
|---|---|---|---|
| EP | 1319574 A2 | * | 6/2003 |
| JP | 2003274504 A | * | 9/2003 |

* cited by examiner

Primary Examiner—Thomas G. Black
Assistant Examiner—Brian J. Broadhead
(74) Attorney, Agent, or Firm—Oblon, Spivak, McClelland, Maier & Neustadt, P.C.

(57) ABSTRACT

A controller controls an electric motor to provide assist power corresponding to steering operation for an electric power steering apparatus. The controller comprises a detecting device, a filtering device, a judging device and a determining device. The detecting device detects present voltage of a power source for the electric motor. The filtering device filters the present voltage based on a small time-constant when the voltage of the power source increases and based on a large time-constant when the voltage of the power source decreases. The judging device judges whether the filtered voltage is lower than a predetermined threshold. And, the determining device determines being abnormality of the power source when it is judged that the filtered voltage is lower than the threshold.

15 Claims, 6 Drawing Sheets

S5 : A = FILTERED VOLTAGE Vf × SMOOTHING NUMBER OF TIMES N (5)

S6 : B = A + PRESENT SOURCE VOLTAGE Vb − FILTERED VOLTAGE Vf

S7 : FILTERED VOLTAGE Vf = B / SMOOTHING NUMBER OF TIMES N (5)

S8 : A = FILTERED VOLTAGE Vf × SMOOTHING NUMBER OF TIMES N (250)

S9 : B = A + PRESENT SOURCE VOLTAGE Vb − FILTERED VOLTAGE Vf

S10 : FILTERED VOLTAGE Vf = B / SMOOTHING NUMBER OF TIMES N (250)

PROCESS FOR DETECTING THE ABNORMALITY OF SOURCE VOLTAGE

S22 : FILTERED VOLTAGE Vf = PRESENT SOURCE VOLTAGE Vb

S23 : PRESENT SOURCE VOLTAGE Vb ≧ FILTERED VOLTAGE Vf

S28 : FILTERED VOLTAGE Vf ≦ THRESHOLD Vc

S29 : OUTPUT ABNORMAL SIGNAL

S24 : ( PRESENT SOURCE VOLTAGE Vb − FILTERED VOLTAGE Vf ) ≧ ΔVi

S25 : NEW FILTERED VOLTAGE Vf = LAST FILTERED VOLTAGE Vf + ΔVi

S26 : ( FILTERED VOLTAGE Vf − PRESENT SOURCE VOLTAGE Vb ) ≧ ΔVd

S27 : NEW FILTERED VOLTAGE Vf = LAST FILTERED VOLTAGE Vf − ΔVd

Fig. 6

CONTROLLER AND CONTROL METHOD FOR AN ELECTRIC POWER STEERING APPARATUS

INCORPORATION BY REFERENCE

The present application claims priority under 35 U.S.C. §119 to Japanese Patent Application No. 2001-377061, filed on Dec. 12, 2001. The contents of that application are incorporated herein by reference in their entirety.

BACKGROUND OF THE INVENTION

1. Field of the Invention

This invention relates to a controller and a control method for an electric power steering apparatus installed for vehicles.

2. Discussion of the Background

An electric power steering apparatus provides assist power corresponding to steering operation by an electric motor. It is possible that a voltage drop of a power source which provides power to the electric motor happens because of an abnormality of a battery, a short-circuit of power cable or a loose connection of a connector. The voltage drop affects assist performance of the electric power steering apparatus such as lack of the assist power which makes a driver feel a sense of incongruity or absence of the assist power which makes the steering operation become heavy. A source voltage monitor which always monitors the source voltage is built in a electric power steering apparatus in order to warn the voltage drop to the driver when the source voltage becomes less than a predetermined value.

Generally, the voltage drop occurs temporarily due to starting of other auxiliary equipment, because a common battery is used for both of the auxiliary equipment and the electric power steering apparatus. In addition, the temporary voltage drop occurs due to an instantaneous short-circuit of power cable or an instantaneous loose connection of a connector. Such voltage drop is just temporary, and is regained to normal voltage immediately. However, the source voltage monitor detects the voltage drop as an abnormality when the voltage decreases in less than the predetermined value, even if the voltage drop is temporary such that the assist performance is not affected.

SUMMARY OF THE INVENTION

In view of the foregoing, it is an object of the present invention to provide an improved controller and a control method for an electric power steering apparatus. In order to achieve the above and other objects, one aspect of the present invention provides a controller for controlling an electric motor which provides assist power corresponding to steering operation for an electric power steering apparatus. The controller comprises a detecting device, a filtering device, a judging device and a determining device. The detecting device is configured to detect present voltage of a power source for the electric motor. The filtering device is configured to filter the present voltage based on at least one time-constant. The judging device is configured to judge whether the filtered voltage is lower than a predetermined threshold. And, the determining device is configured to determine being abnormality of the power source when it is judged that the filtered voltage is lower than the threshold.

The present voltage of the power source is filtered, and it is judged whether the filtered voltage is lower than the threshold. Therefore, a temporary voltage drop is not determined as an abnormality.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings. Referring in FIG. 1, mechanical constructions of an electric power steering apparatus according to the first embodiment will be described. A steering wheel 1, which is operated by a driver, is connected with a steering shaft 2. The steering shaft 2 is equipped with a torque sensor 4 and connected with a reduction gear 5 via a torsion bar 3. When the steering wheel 1 is operated, the torsion bar 3 is twisted according to the steering operation. Then, the torque sensor 4 detects quantity of torsion of the torsion bar 3 as steering torque. An electric motor 6 such as D.C. motor is installed so that a gear 7, which is fixed on an output shaft thereof, is engaged with the reduction gear 5. A pinion shaft 8 is connected with the reduction gear 5 at one end thereof and connected with a pinion 9 at the other end thereof. The pinion 9 is engaged with racks of a rack shaft 10. A tie-rod 12 is connected with each end of the rack shaft 10. A knuckle 13 is rotatably connected with each tip of the tie-rod 12. A front wheel 14 is fixed on each knuckle 13. Rotation of the electric motor 6 is reduced by the reduction gear 5 and transmitted to the pinion shaft 8, and further transmitted to the rack shaft 10 through a rack and pinion mechanism 11. Motion of the rack shaft 10 is transmitted to the knuckles 13 through the tie-rods 12. According to the aforementioned structures, turning the front wheels 14 is assisted by the electric motor 6.

Figure 1:
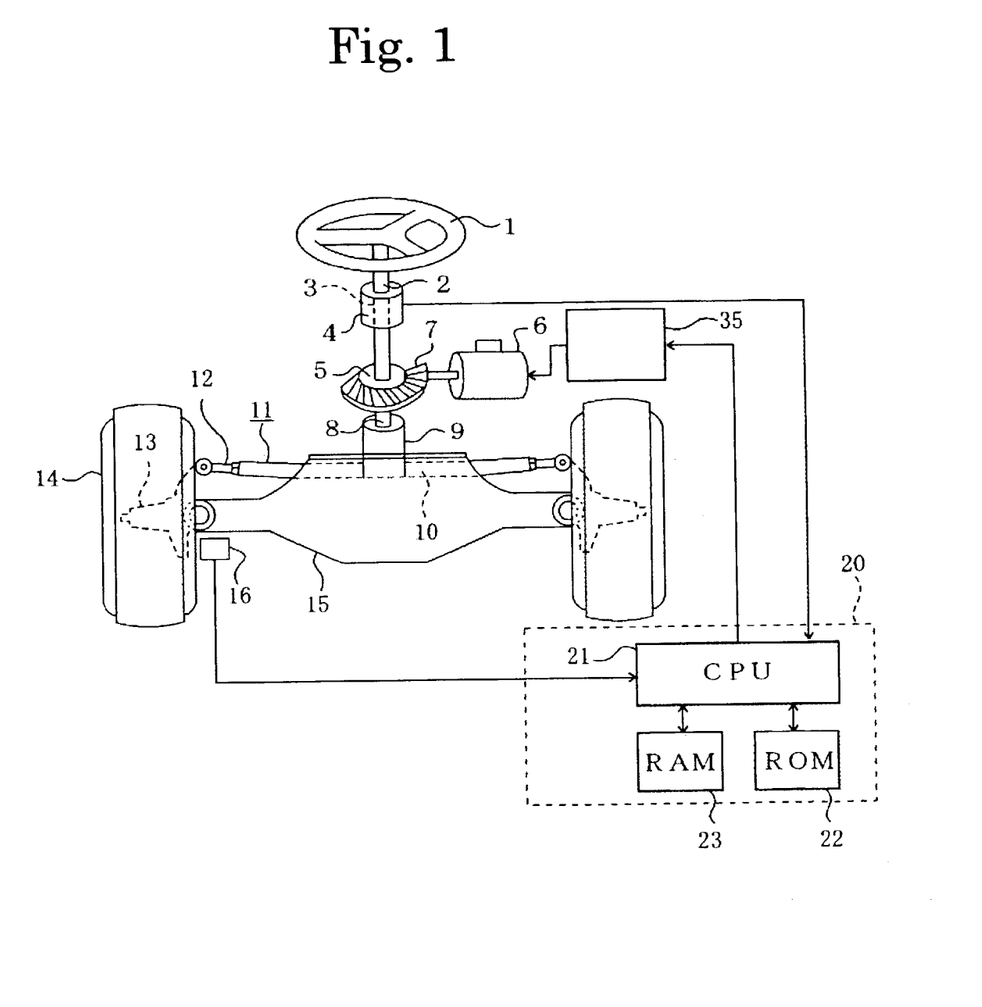
FIG. 1 is a schematic view showing an electric power steering apparatus according to a first embodiment of the present invention.
Figure 2:
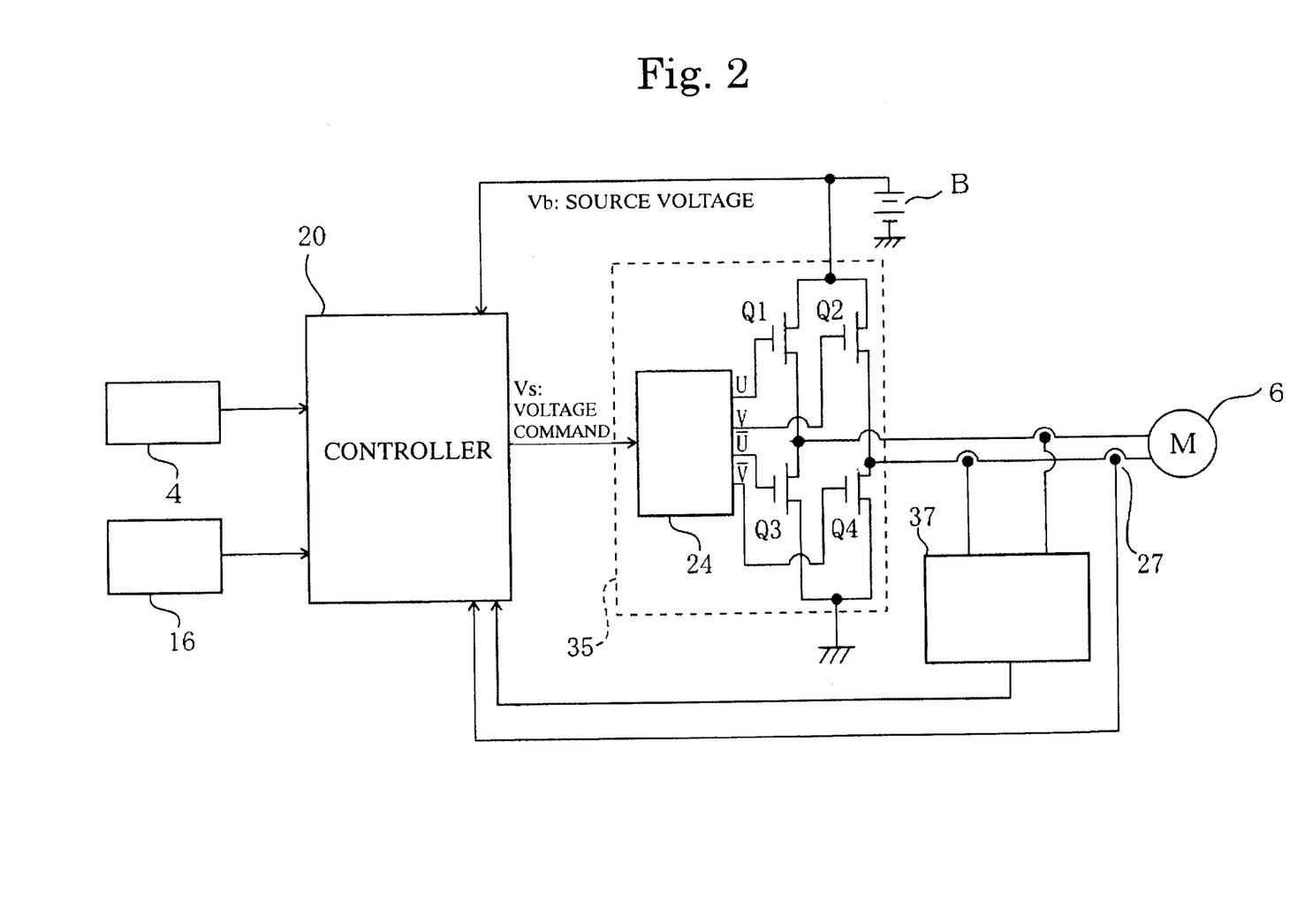
FIG. 2 is a block diagram showing a controller and a motor drive circuit of the first embodiment.

Referring FIG. 1 and FIG. 2, electric constructions of the electric power steering apparatus will be described. A controller 20 for the electric power steering apparatus mainly comprises a central processing unit (CPU) 21, a read only memory (ROM) 22, a random access memory (RAM) 23 and interfaces (not shown). The ROM 22 stores control programs which is executed by CPU 21. The RAM 23 temporarily stores data which is needed for processing of the CPU 21. The torque sensor 4 and a vehicle speed sensor 16 are electrically connected with the controller 20 via the interfaces. The CPU 21 executes the control programs, and calculates assist current command based on steering torque signal inputted from the torque sensor 4 and vehicle speed signal inputted from the vehicle speed sensor 16. A motor current detection circuit 27 and a motor-terminals-voltage detection circuit 37 are also electrically connected with the controller 20. The CPU 21 converts the assist current command into voltage command Vs based on real current value detected by the motor current detection circuit 27 and real voltage value detected by the motor-terminals-voltage detection circuit 37, and outputs the voltage command Vs to a motor drive circuit 35. The motor drive circuit 35 which is also electrically connected with the controller 20 comprises a PWM (Pulse Width Modulation) circuit 24 and switching elements Q1–Q4. The motor drive circuit 35 is configured to drive the electric motor 6 so that pulse signal which has a pulse width corresponding to the voltage command Vs is outputted to U-phase and V-phase respectively, and makes the switching elements Q1–Q4 turn on and off.

The motor drive circuit 35 is electrically connected with a power source (battery) B. The power source B is connected with the controller 20 which also functions as a source voltage monitor and always monitors present source voltage Vb of the power source B. The controller 20 as the source voltage monitor processes a filtering of the present source voltage Vb of power source B, and detects abnormality to compare filtered voltage Vf with a predetermined threshold Vc.

Figure 3:
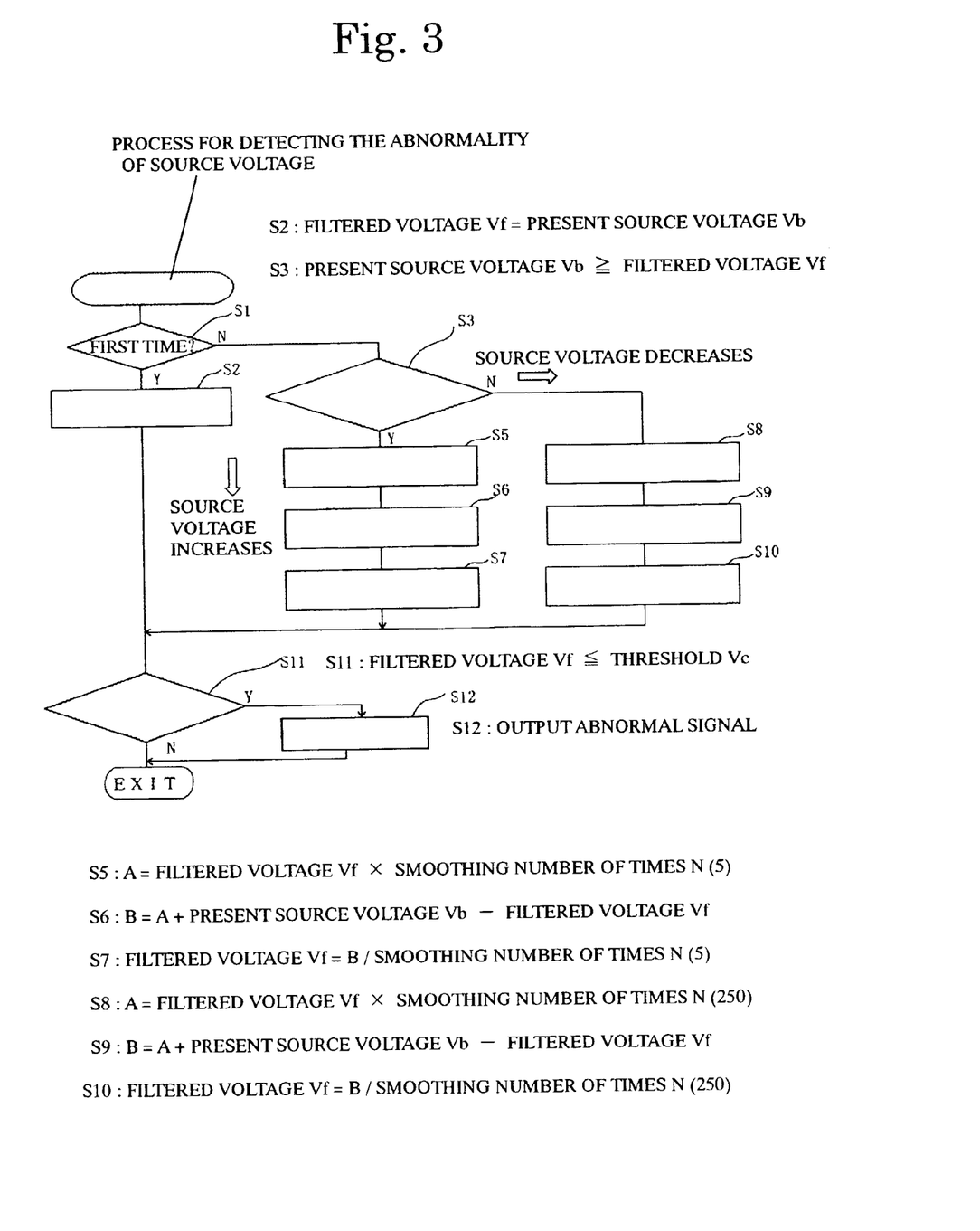
FIG. 3 is a flow-chart showing an abnormality detection process of the first embodiment.

The process for detecting the abnormality of source voltage will be described hereinafter referring the flowchart in FIG. 3. In step S1, the CPU 21 of the controller judges whether coming to step S1 is first time after turning on an ignition. If the coming to step S1 is first time (S1=Yes), the process advances to step S2. If the coming to step S1 is not first time (S1=No), the process advances to step S3. In step S2, the present (detected) source voltage Vb is considered to be the filtered voltage Vf and is memorized as the filtered voltage Vf. On the other hand, the present source voltage Vb is compared with the filtered voltage Vf (memorized in step S2, S7 or S10) in step S3. If the present source voltage Vb is equal or larger than the filtered voltage Vf (S3=Yes), the process advances to step S5. Since this situation means increasing of the source voltage, the present source voltage Vb is processed of a filtering in steps S5 to S7 and new filtered voltage Vf is calculated. On the other hand, if the present source voltage Vb is smaller than the filtered voltage (S3=No), the process advances to step S8. Since this case means decreasing of the source voltage, the present source voltage Vb is processed of another filtering in steps S8 to S10 and a new filtered voltage Vf is calculated. In this manner, the different filtering processes are executed according to whether the source voltage decreases or decreases. The filtered voltage Vf is calculated in steps S5 to S7 and S8 to S10 as follows.

$A$=(filtered voltage $Vf$)×(smoothing number of times $N$) [S5 and S8]

$B$=$A$+(present source voltage $Vb$)−(filtered voltage $Vf$) [S6 and S9]

(filtered voltage $Vf$)=$B$/(smoothing number of times $N$) [S7 and S10]

Figure 4:
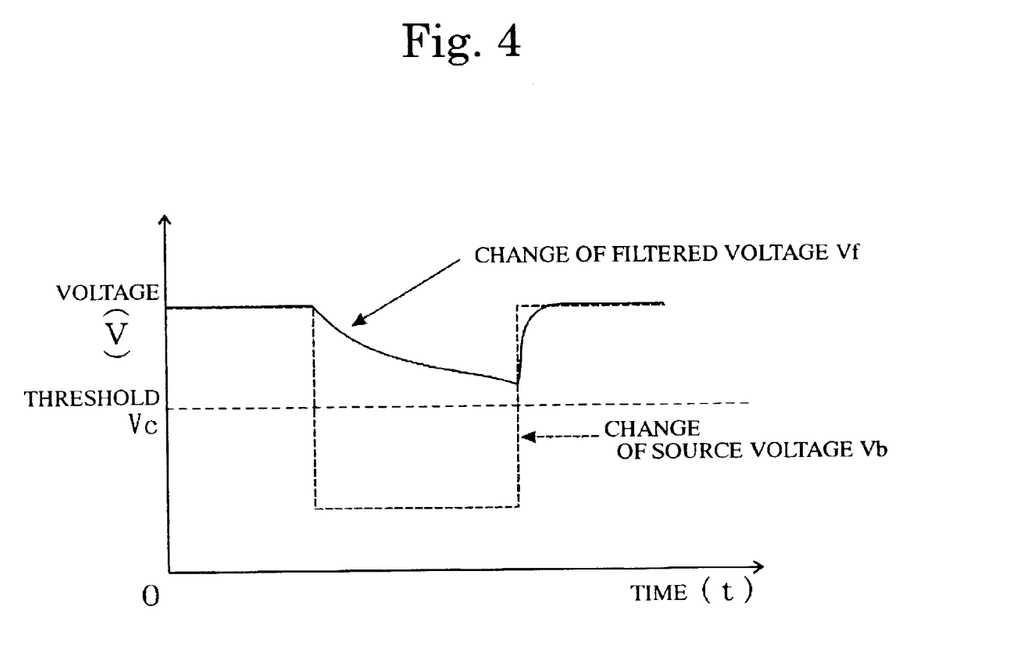
FIG. 4 is a graph showing a relationship between source voltage and filtered voltage.

Here, A and B are just parameters. The same expressions are used between steps S5 to S7 and steps S8 to S10, however the smoothing number of times N are different each steps. For instance, the smoothing number of times N is set as five in steps S5 and S7, on the other hand, it is set as two hundred fifty in steps S8 and S10. That is, when the source voltage increases, the smoothing number of times N is set as a small number, and when the source voltage decreases, it is set as a large number. In other words, setting small number as the smoothing number of times N means being filtered by a small time-constant which responds quickly, and setting large number as the smoothing number of times N means being filtered by a large time-constant which responds slowly. In a case that the source voltage changes as shown by a broken line in FIG. 4, when the source voltage increases, the filtered voltage Vf is proceeded to follow the source voltage Vb quickly. On the other hand, when the source voltage decreases, the filtered voltage Vf is proceeded to follow the source voltage Vb slowly. The filtered voltage Vf proceeded as above is compared with the threshold Vc in step 11. If the filtered voltage Vf is larger than the threshold Vc (S11=No), it is judged that the source voltage is normal. If the filtered voltage Vf is equal or smaller than the threshold (S11=Yes), it is judged that the source voltage is abnormal and the process advances to step S12. In step S12, the abnormality of the source voltage is informed to the driver by outputting a signal such as warning light. The controller 20 as source voltage monitor always monitors the source voltage by executing the aforementioned steps repeatedly every dozens milliseconds.

In a conventional way, i.e. it is not processed the filtering, when the source voltage decreases in less than the threshold, even if it is temporarily, the source voltage monitor detects it as the abnormality. However, according to the first embodiment of the present invention, when the source voltage decreases in less than the threshold Vc, since the present source voltage Vb is filtered by the large time-constant which responds slowly, if only the decreasing is temporarily, the filtered voltage Vf does not fall in less than the threshold Vc. Therefore, temporarily decreasing of the source voltage is not detected as the abnormality. The accuracy or the reliability for detecting abnormality is improved. On the other hand, when the source voltage increases (recovers), since the present source voltage Vb is filtered by the small time-constant which responds quickly, the filtered voltage Vf comes to close or to be equal with the present source voltage Vb immediately.

Figure 5:
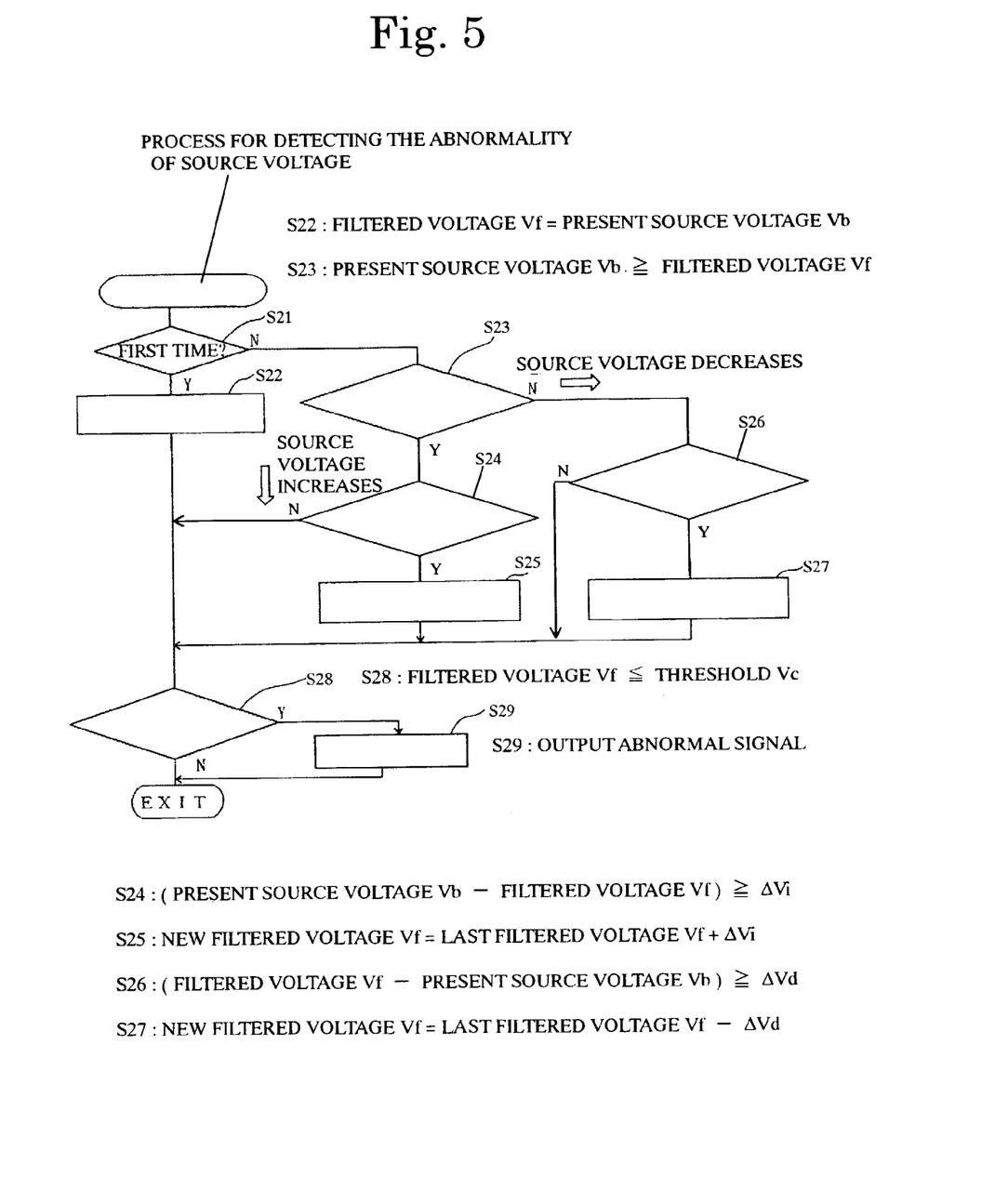
FIG. 5 is a flow-chart showing an abnormality detection process of a second embodiment of the present invention.

The second embodiment will be described hereinafter referring the flowchart in FIG. 5. Since the second embodiment is same as the first embodiment except that a flowchart shown by FIG. 5 is used as a process for detecting the abnormality of source voltage instead of the flowchart shown by FIG. 3, description for other constructions are omitted. In step S21, the CPU 21 of the controller judges whether coming to step S21 is first time after turning on the ignition. If the coming to step S21 is first time (S21=Yes), the process advances to step S22. If the coming to step S21 is not first time (S21=No), the process advances to step S23. In step S22, the present (detected) source voltage Vb is consider to be the filtered voltage Vf and is memorized as the filtered voltage Vf. On the other hand, the present source voltage Vb is compared with the filtered voltage Vf (memorized step S22, S25 or S27) in step S23. If the present source voltage Vb is equal or larger than the filtered voltage Vf (S23=Yes), the process advances to step S24. Since this situation means increasing of the source voltage, increment of the source voltage (present source voltage Vb−filtered voltage Vf) is calculated and compared with a predetermined addition value $\Delta$Vi. If the increment of the source voltage is equal or larger than the addition value $\Delta$Vi (S24=Yes), the process advances to step S25 and new filtered voltage Vf is calculated as follows:

new filtered voltage $Vf$=last filtered voltage $Vf$+$\Delta Vi$

If the increment of the source voltage is smaller than the addition value ΔVi (S24=No), the process advances to step S28, i.e. the filtered voltage Vf is not renewed. On the other hand, if the present source voltage Vb is smaller than the filtered voltage Vf (S23=No), the process advances to step S26. Since this situation means decreasing of the source voltage, decrement of the source voltage (filtered voltage Vf–present source voltage Vb) is calculated and is compared with a predetermined subtraction value ΔVd. If the decrement of the source voltage is equal or larger than the subtraction value ΔVd (S26=Yes), the process advances to step S27 and new filtered voltage Vf is calculated as follows:

new filtered voltage *Vf*=last filtered voltage *Vf*−Δ*Vd*

If the decrement of the source voltage is smaller than the subtraction value ΔVd (S26=No), the process advances to step S28, i.e. the filtered voltage Vf is not renewed.

The addition value ΔVi is set as a large value and the subtraction value ΔVd is set as a small value. As the result, when the source voltage increases, the filtered voltage Vf is calculated so as to follow change of the present voltage immediately because the addition value ΔVi is large. On the other hand, when the source voltage decreases, even if the decrement of the source voltage Vb is large, the filtered voltage Vf does not change immediately, because the subtraction value ΔVd is small. That is, setting large value as the addition value ΔVi means being filtered by a small time-constant which responds quickly, and setting small value as the subtraction value ΔVd means being filtered by a large time-constant which responds slowly. The filtered voltage Vf proceeded as above is compared with the threshold Vc in step S28. If the filtered voltage Vf is larger than the threshold Vc (S28=No), it is judged that the source voltage is normal. If the filtered voltage Vf is equal or smaller than the threshold (S28=Yes), it is judged that the source voltage is abnormal and the process advances to step S29. In step S29, the abnormality of the source voltage is informed to the driver by outputting a signal such as warning light. The controller 20 as source voltage monitor always monitors the source voltage by executing the aforementioned steps repeatedly every dozens milliseconds. According to the second embodiment of the present invention, the filtered voltage Vf is changed in the same way with it of the first embodiment except that the change of the filtered voltage Vf is stepped (digital) in the second embodiment in stead of being smooth (analogue) in the first embodiment. Therefore, the filtered voltage Vf is changed quickly when the present voltage Vb increases and is changed slowly when the present voltage Vb decreases. Therefore, temporarily decreasing of the source voltage is not detected as the abnormality.

Figure 6:
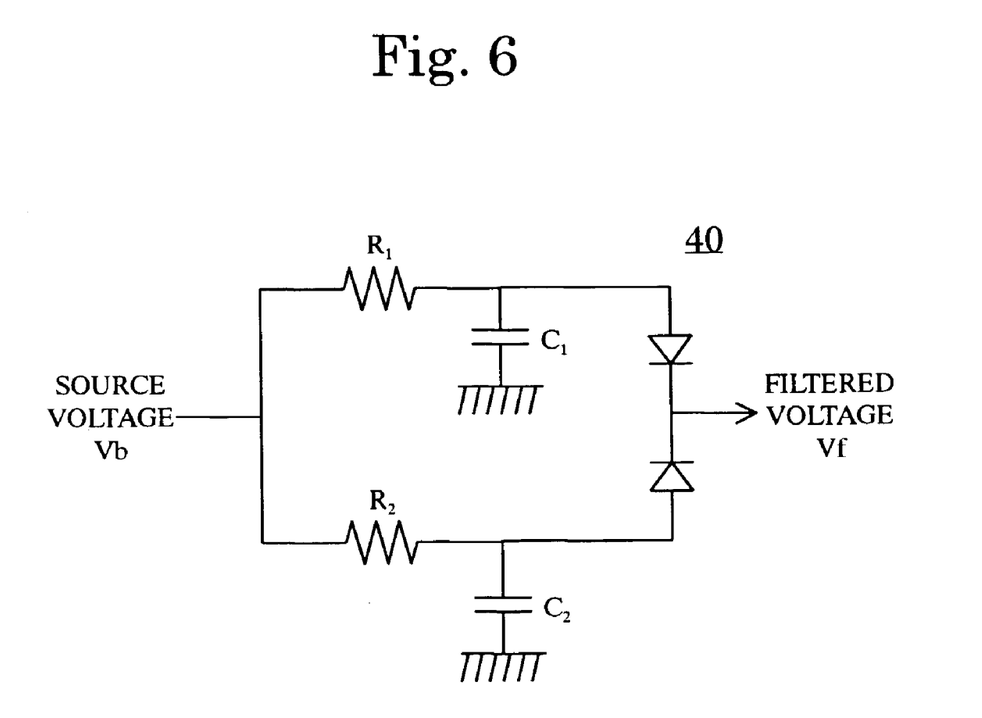
FIG. 6 is a circuit diagram for band pass filter of a third embodiment of the present invention.

The third embodiment will be described hereinafter referring the circuit diagram for the band-pass-filter shown by FIG. 6. Although the present source voltage Vb is proceeded by software to get the filtered voltage Vf in the first and second embodiments, the band-pass-filter as hardware is used in the third embodiment. Since the third embodiment is same with the first and second embodiments except that the band-pass-filter shown 40 by FIG. 6 is used as a process for detecting the abnormality of source voltage instead of the flowcharts shown by FIG. 3 and FIG. 5, description for other constructions are omitted. The band-pass-filter 40 has a pair of combinations of a resistor $R_1$, $R_2$ and a capacitor $C_1$, $C_2$, which are connected so as to construct a disjunction (OR circuit) as shown by FIG. 6. The present source voltage Vb is inputted to the band-pass-filter 40, and the band-pass-filter 40 outputs the filtered voltage Vf. The filtered voltage Vf is compared with the threshold Vc. Ohmic values of the resistor $R_1$, $R_2$ and capacities of the capacitor $C_1$, $C_2$ are tuned so that a product of $R_1$ and $C_1$ extremely larger than a product of $R_2$ and $C_2$. That is, the combination of the resistor $R_1$ and the capacitor $C_1$ is a large time-constant circuit, and the combination of the resistor $R_2$ and the capacitor $C_2$ is a small time-constant circuit. Since these combinations construct the disjunction, when the present source voltage Vb is inputted to the band-pass-filter 40, either large value is outputted as the filtered voltage Vf. Therefore, when the source voltage Vb increases, the filtered voltage Vf follows the change of the source voltage Vb quickly. On the other hand, when the source voltage Vb decreases, the filtered voltage Vf follows the change of the voltage Vb slowly. Therefore, temporarily decreasing of the source voltage is not detected as the abnormality.

Obviously, numerous modifications and variations of the present invention are possible in light of the above teachings. It is thereby to be understood that within the scope of the appended claims, the present invention may be practiced otherwise than as specifically described herein.

What is claimed is:

1. A controller for controlling an electric motor which provides assist power corresponding to steering operation for an electric power steering apparatus, comprising:
    a detecting device configured to detect present voltage of a power source for the electric motor;
    a filtering device configured to filter the present voltage based on at least one time-constant;
    a judging device configured to judge whether the filtered voltage is lower than a predetermined threshold; and
    a determining device configured to determine an abnormality of the power source when it is judged that the filtered voltage is lower than the threshold,
    wherein the filtering device filters the present voltage based on a first time-constant when the voltage of the power source increases and based on a second time-constant when the voltage of the power source decreases.

2. A controller according to claim 1, wherein the second time-constant is larger than the first time-constant.

3. A controller according to claim 2, wherein the filtering device is configured by software which calculates the filtered voltage using past filtered voltages and a smoothing number affecting the first and second time-constants.

4. A controller according to claim 2, wherein the filtering device is configured by software which calculates the filtered voltage using a predetermined addition value based on the first time-constant and a predetermined subtraction value based on the second time-constant.

5. A controller according to claim 2, wherein the filtering device is a band-pass-filter.

6. A controller for controlling an electric motor which provides assist power corresponding to steering operation for an electric power steering apparatus, comprising:
    detecting means for detecting present voltage of a power source for the electric motor;
    filtering means for filtering the present voltage based on at least one time-constant;
    judging means for judging whether the filtered voltage is lower than a predetermined threshold; and
    determining means for determining an abnormality of the power source when it is judged that the filtered voltage is lower than the threshold,
    wherein the filtering means filters the present voltage based on a first time-constant when the voltage of the power source increases and based on a second time-constant when the voltage of the power source decreases.

7. A controller according to claim 6, wherein the second time-constant is larger than the first time-constant.

8. A controller according to claim 7, wherein the filtering means is software which calculates the filtered voltage using past filtered voltages and a smoothing number affecting the first and second time-constants.

9. A controller according to claim 7, wherein the filtering means is software which calculates the filtered voltage using a predetermined addition value based on the first time-constant and a predetermined subtraction value based on the second time-constant.

10. A controller according to claim 7, wherein the filtering means is a band-pass-filter.

11. A control method for controlling an electric motor which provides assist power corresponding to steering operation for an electric power steering apparatus, comprising:
    detecting present voltage of a power source for the electric motor;
    filtering the present voltage based on at least one time-constant;
    judging whether the filtered voltage is lower than a predetermined threshold; and
    determining an abnormality of the power source when it is judged that the filtered voltage is lower than the threshold,
    wherein the present voltage is filtered based on a first time-constant when the voltage of the power source increases and based on a second time-constant when the voltage of the power source decreases.

12. A control method according to claim 11, wherein the second time-constant is larger than the first time-constant.

13. A control method according to claim 11, wherein the filtered voltage is calculated by using past filtered voltages and a smoothing number affecting the first and second time-constants.

14. A control method according to claim 11, wherein the filtered voltage is calculated by using a predetermined addition value based on the first time-constant and a predetermined subtraction value based on the second time-constant.

15. A control method according to claim 11, wherein the present voltage is filtered by a band-pass-filter.

* * * * *